US007668888B2

(12) United States Patent
Irle et al.

(10) Patent No.: US 7,668,888 B2
(45) Date of Patent: Feb. 23, 2010

(54) CONVERTING OBJECT STRUCTURES FOR SEARCH ENGINES

(75) Inventors: Klaus Irle, Walldorf (DE); Liwei Lu, Nussloch (DE); Uwe Kindsvogel, Ubstadt-Weiher (DE); Tatjana Janssen, Bad Nendorf (DE)

(73) Assignee: SAP AG, Walldorf (DE)

( * ) Notice: Subject to any disclaimer, the term of this patent is extended or adjusted under 35 U.S.C. 154(b) by 324 days.

(21) Appl. No.: 10/846,689

(22) Filed: May 17, 2004

(65) Prior Publication Data

US 2005/0021542 A1 Jan. 27, 2005

Related U.S. Application Data

(60) Provisional application No. 60/476,469, filed on Jun. 5, 2003.

(51) Int. Cl.
*G06F 7/00* (2006.01)
*G06F 17/30* (2006.01)
(52) U.S. Cl. ...................................................... 707/756
(58) Field of Classification Search .................. 707/3, 707/104.1
See application file for complete search history.

(56) References Cited

U.S. PATENT DOCUMENTS

| 5,845,299 | A | | 12/1998 | Arora et al. | |
|---|---|---|---|---|---|
| 6,754,670 | B1 | * | 6/2004 | Lindsay et al. | 707/103 R |
| 6,829,606 | B2 | * | 12/2004 | Ripley | 707/5 |
| 6,834,276 | B1 | * | 12/2004 | Jensen et al. | 707/2 |
| 6,920,458 | B1 | * | 7/2005 | Chu et al. | 707/102 |
| 7,093,001 | B2 | * | 8/2006 | Yang et al. | 709/219 |
| 7,272,594 | B1 | * | 9/2007 | Lynch et al. | 707/3 |
| 2001/0034786 | A1 | * | 10/2001 | Baumeister et al. | 709/231 |
| 2002/0013779 | A1 | * | 1/2002 | Sridhar | 707/4 |
| 2002/0184269 | A1 | * | 12/2002 | Imagou | 707/523 |
| 2003/0167266 | A1 | * | 9/2003 | Saldanha et al. | 707/6 |

FOREIGN PATENT DOCUMENTS

| GB | 2 357 877 A | 7/2001 |
|---|---|---|
| WO | WO 02/35395 A2 | 5/2002 |

OTHER PUBLICATIONS

Calvanese, Diego et al., *Source Integration in Data Warehousing*, Proceedings, Ninth International Workshop on Database and Expert Systems Applications, Vienna, Austria, Aug. 26-28, 1998, pp. 192-197.
Communication from the European Patent Office, EP Application No. 03 012 789.8, Sep. 27, 2007, 6 pages.

* cited by examiner

*Primary Examiner*—James Trujillo
*Assistant Examiner*—Jorge A Casanova
(74) *Attorney, Agent, or Firm*—Finnegan, Henderson, Farabow, Garrett & Dunner LLP

(57) ABSTRACT

The present invention provides computer-implemented methods and systems for creating at least one readable object for search engines from at least one structured data object stored in a database. To enable the search to use conventional search methods and search engines, the structured data object may be extracted from the database, the structure and content of the data object may be mapped into a generic data model, and the readable object may be created from the generic data model.

73 Claims, 8 Drawing Sheets

| fieldname | | type | size | description |
|---|---|---|---|---|
| nodeID | pk | char | 10 | node ID |
| family | | char | 30 | name of family |
| nodeName | | char | 40 | name of son node |
| nodeType | | char | 30 | type of node |
| changeDate | | char | 20 | changedate |
| user | | char | 40 | User |
| start_date | | char | 20 | valid from |
| end_date | | char | 20 | valid through |
| instanceID ... ... | fk | char | 10 | Data ID |

Fig.5a

| fieldname | | type | size | description |
|---|---|---|---|---|
| nodeID | fk | char | 10 | node ID |
| linkNode | | char | 10 | links |
| linktype ... ... | | char | 20 | direction of links (parent/son) |

Fig.5b

| fieldname | | type | size | description |
|---|---|---|---|---|
| instanceID | pk | char | 10 | ID of Object |
| name | | char | 40 | Object name |
| descr | | char | 80 | Object description |
| ... ... | | | | |

Fig.5c

CONVERTING OBJECT STRUCTURES FOR SEARCH ENGINES

RELATED APPLICATIONS

This application claims the benefit of priority of U.S. Provisional Patent Application No. 60/476,469, filed Jun. 5, 2003, which is herein expressly incorporated by reference.

FIELD OF THE INVENTION

The present invention relates to computer-implemented methods and systems for providing at least one readable object for access by a search engine from at least one structured data object stored in a database

BACKGROUND OF THE INVENTION

In software products designed for Enterprise Resource Planning (ERP) systems, data objects are stored within structured objects. In this case, the data objects may relate to various areas within a company such as, for example, client data, factory structures, machine structures, production sequences, lists of materials, lists of staff and many others. Data objects comprising company data may be referred to as "business objects." The structure of data objects may be predetermined by real conditions within the company and for maintenance. The data objects may simulate these real structures.

The contents of the data objects may represent the current state of each particular company structure being mapped within the objects and thus allow computer-aided planning, maintenance and the operation of a company with the aid of ERP software.

Data objects can be interlinked and represent an entire company network in an object structure which may be hierarchical. The mesh of objects should thus represent the actual structure of the company as far as possible.

In order to search for information within the data objects, the user requires a user-friendly user interface as well as fast and reliable access to the data. With conventional search engines, such as those available on the Internet, for example, document-like objects are almost exclusively displayed. These document-like objects, for example, text documents, are structured only slightly and can be searched with the aid of simple algorithms. The content of the text documents can be indexed automatically in most cases. The search engines access the created index during their search. However, they can also execute a full text search.

During the search, the keyword being sought may be searched for in the index or in the full text. In the event of a match, a link to the corresponding text document may be output. The user may then directly access the text document via this link.

Data objects may also comprise text documents that are not stored within a flat document structure but instead are stored as structured data objects. In this case, it is nearly impossible to search within these structured data objects with acceptable response times and good search results using conventional search engines alone. Since the user himself generally does not know the structure of the data objects, the search for information frequently requires considerable effort.

Certain embodiments of the present invention address the need for tools for searching within structured data objects with the aid of conventional search algorithms. Certain embodiments of the present invention also may address the need to map structured data objects in a fashion readable by conventional search engines, while some embodiments may address the need to facilitate indexing of such structured data objects, allowing more flexible options in searching structured data objects.

SUMMARY OF THE INVENTION

Methods and systems consistent with the present invention provide at least one readable object for access by a search engine from at least one structured data object stored in a database. The structured data object is extracted from the database. Structure and contents of the structured data object is mapped into a generic data model including nodes related by links and having contents, and a readable object is created from the generic data model that may be used for searching by conventional search engines.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings:

FIG. 5a shows one exemplary structure of a node table consistent with the present invention;

FIG. 5b shows one exemplary structure of a link table consistent with the present invention;

FIG. 5c shows one exemplary structure of a content table consistent with the present invention;

DETAILED DESCRIPTION

Figure 1:
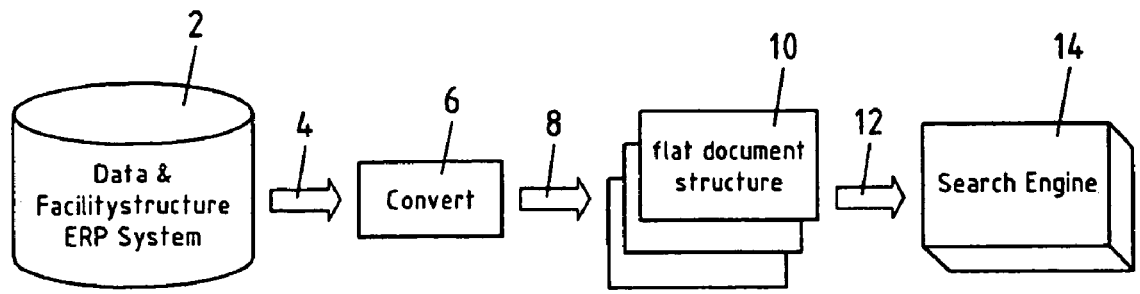
FIG. 1 illustrates a method according to the invention.

Methods and systems consistent with the present invention allow structured data objects to be searched using conventional search algorithms. FIG. 1 depicts an exemplary method according to the invention. As shown in FIG. 1, data of an Enterprise Resource Planning (ERP) system may be stored in a database 2 as data objects. The databases allow access to the data via interfaces, such as for example SQL.

An ERP system may consist of one or more business applications for managing, for example, financial accounts, staff planning, material planning, business partner data, parts lists, maintenance and much more. In the databases of an ERP system, the contents and structures of the data used by such business applications may be stored in so-called business objects. A business object is a structured data object comprising data relating to the functions of the business. In the data objects, the data may be created in a nested fashion, and each data object can in turn contain its own objects.

In the method shown, static or quasi-static data objects, also called data entities or data objects, may be made available for the search. Data objects may be, for example, material masters, equipment and business partners. These data objects may have formatted attributes such as master data attributes, client-specific attributes, classification and feature-imprinting attributes. The data objects may contain information fields in which the contents of the respective data objects may be described using text.

Figure 2:
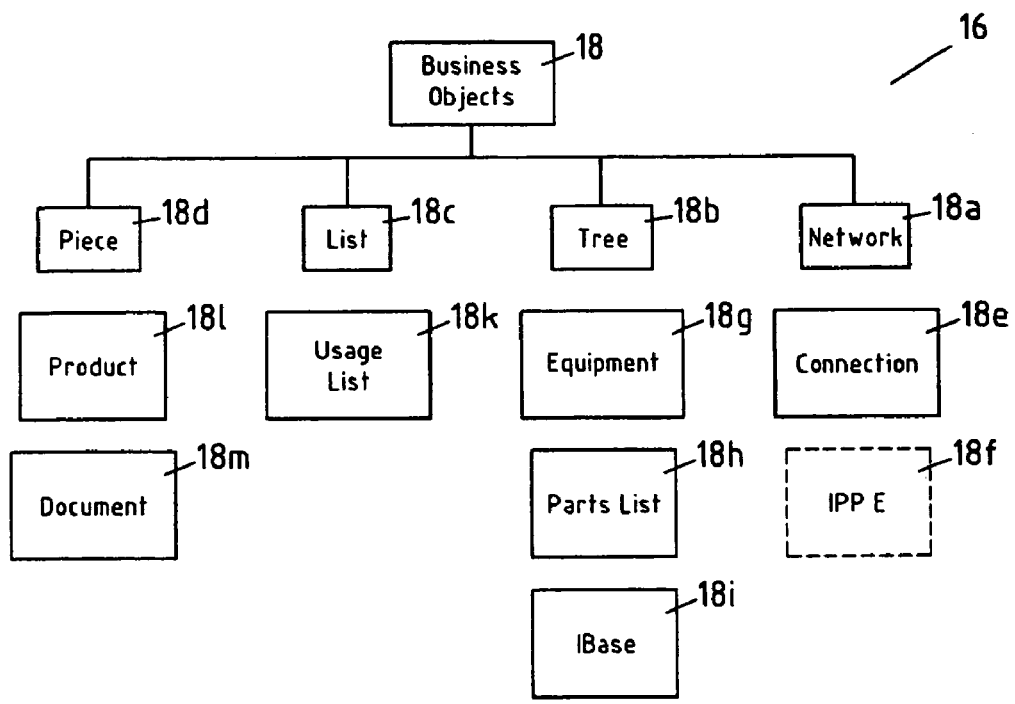
FIG. 2 is a listing of exemplary object structures.

FIG. 2 shows various implementations 16 of exemplary object structures of data objects. These object structure implementations 16 may include, for example, object structures 18a-d. Thus, a data object 18 can belong to the piece list structure group 18d, and, for example, represent a product 18l or a document 18m. A data object 18 can also be allocated to the list structure group 18c. In this case its content can also be a proof of usage list 18k. A data object 18 can also be allocated to the tree structure group 18b, in which case its content can be an equipment 18g, a parts list 18h, or again data object 18i, e.g., IBase. This means that within a data object 18, a nesting of data objects 18 can occur. Finally, a data object 18 can be allocated to the network structure group 18a. In this case, its content could be a connection 18e or an IPPE 18f.

Returning now to FIG. 1, in step 4, a data object 18 or a plurality of data objects 18 may be extracted from the database 2 and converted into a generic data model in step 6. The data objects may be extracted from the database using instructions between the interfaces or other methods. Both the structure and the contents of the data objects may be then mapped into a generic data model that allows conversion of the data object into an object readable by conventional search engines.

A data object may be mapped into a generic data structure in step 6 by, for example, mapping the data object using node, link, and content information. Each data object can be divided into nodes, links and contents. The structure of a data object may be obtained from the mesh of nodes and links and be mapped into a data model. The data model may be a mesh of nodes and links which may have a hierarchical structure. The structure of the data object may be a concatenation of a plurality of objects which represents the structure of the real object together with its attributes. The nodes, the links and the contents can also be treated independently of one another which is a concept known as "loose coupling." The data structure and the respective contents need not be fixedly connected and may be dynamically exchangeable and combinable.

In at least one embodiment, the data structure of the data object may be mapped using three tables. For example, one table may be created that represents the nodes, one table for the links, and one table for the objects themselves, i.e., the content of the data objects. The node table may contain, for example, a node number, the name of the hierarchical structure, the type of node, its date of amendment, its date of creation, the creator, validity information and further information required for the administration of the data object. The link table gives information about the links between the nodes so that, for example, the identification numbers of the father node and the son node may be given. The structure of the data object can be mapped using the link table. The content table allows the description of the elementary objects of the data object, such as, for example, materials, accessories, business partners, client-specific attributes, master data attributes as well as other contents, to be stored in text form.

In at least one embodiment, it may be possible to map the entire tree structure of a data object within only one readable object. If the data object is stored in a single readable object, this document contains information on the nodes, links and contents and thus gives a complete picture of the data object.

A further possibility is to create one readable object for each node. In this case this readable object contains information on the respective node, the links directly connected thereto and thus information on the neighboring nodes, and the content of the respective node. These readable objects may be smaller in size but do not allow any direct conclusions on the structure of the entire data object.

A further possibility for mapping a data object into a readable object is to map the structure of an object into three different types of readable objects, which means that a first readable object may be created for the links, a second readable object for the nodes, and a third readable object for the content, wherein these readable object may be of different types. Furthermore a readable object may be created for each node, link, and content, respectively. Such, each table row will be mapped onto a single document.

After the structure and the content of the data object have been mapped into a generic data model, a readable object may be created from the generic data model using a uniform algorithm in step 8. This algorithm may be a conversion from structured objects into XML documents, or any other algorithm, for example, as described within FIGS. 6-8. This readable object can be a searchable document structure such as a flat text document 10. The created flat text documents can, for example, be Standard Generalized Markup Language (SGML), or Extensible Markup Language (XML) documents. Each text document 10 can represent a part, a whole, or a plurality of data objects 18.

Search engine 14 may then perform a search on the set of text documents 10. The search may be executed within the document structure of the readable object, allowing the use of known search strategies. Search engine 14 may perform, for example, a conventional full text search. Using the search engine 14 on text documents 10, relevant information in data objects 18 may be located. The search can result in the output of the document structure or can output a link to the actual data object.

In step 12, optionally, an index may be created, which can be used by search engine 14 in performing the search. In certain embodiments, one or more indexes may be formed as a result of the conversion of the data object into the readable object. Search engine 14 may then search the created indexes rather than the text documents 10. When using indexes, the search engine generally searches less data, therefore the time needed to obtain a response to a search query may be reduced. Additionally, in certain embodiments, searching only the indexes may prevent or reduce having to interact (and possibly slow down) the database storing the readable data objects. In order to keep the search results up-to-date, the index may be updated at certain intervals.

In certain embodiments, it may be advantageous to convert the data objects temporarily into readable objects, index them, and then delete them. In this case, only the created index would be used in the following search. In the event of a successful search, a link to the original data object may be displayed. In order to display the content of the data object, however, the content would have to be converted into the readable object again. In this embodiment, data redundancy may be reduced or avoided, as only the data objects are stored and not the readable data objects as well.

In certain embodiments, the readable data objects may be stored permanently on a server. An index may also be created for the readable objects. In this case, searching can be carried out both via the index and also via a full text search on the stored readable objects.

In order to facilitate the search, attributes or document keys, such as a file, link, or node name, may be associated with the documents. The attributes may, for example, specify the type of document. The attributes may be used by the search engine to facilitate the search.

In certain embodiments of the present invention, searches may be executed using a conventional search engine together with the searchable document structure. In the event of a successful search, the document structure may be at least partly displayed. The search engine may search through the document structures using conventional search strategies such as, for example, a full text search or using so-called "robots." Links to the particular documents may be provided on request.

The search engine may also initiate a full text search when requested by a user. In this case, the results may be more up-to-date than those from a search on an index.

Some data objects may contain sensitive content. In certain situations, access to the content of these data objects must be monitored and safeguarded. In certain embodiments, an authorization check may be carried out prior to performing the search on certain data objects. If the result of the authorization check is positive, that is to say, if the user has authorization to use the content, the search will be executed. If the user does not have authorization, the search may terminate or skip only those data objects for which authorization to search is required. Using this method helps ensure that sensitive information stored in certain data objects does not reach unauthorized third parties.

Figure 3A:
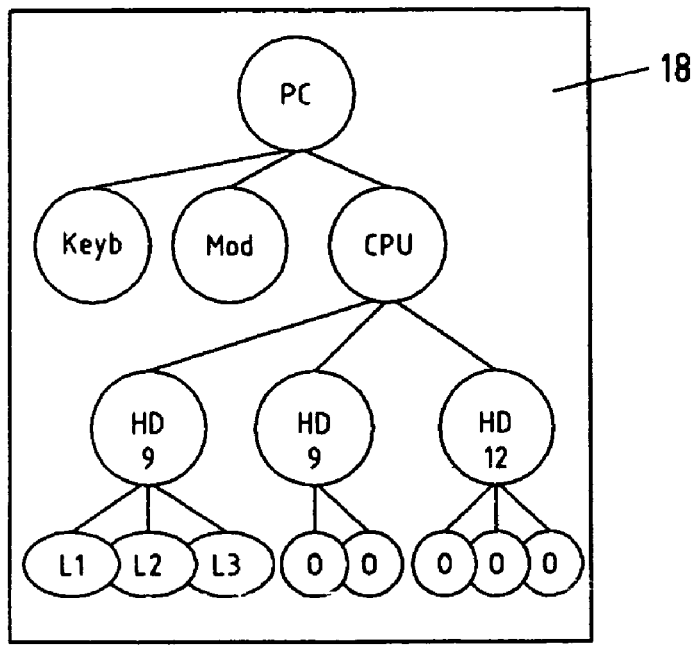
FIG. 3 shows structures of exemplary business objects.

FIG. 3 depicts exemplary structures of data objects 18 consistent with the present invention. FIG. 3a depicts the structure of a first data object 18. This data object 18 represents a PC, connected with a keyboard, a modem, and a CPU. The CPU in turn has three hard disks which may be subdivided into various partitions. The hard disks may be additionally characterized by their size.

Figure 3B:
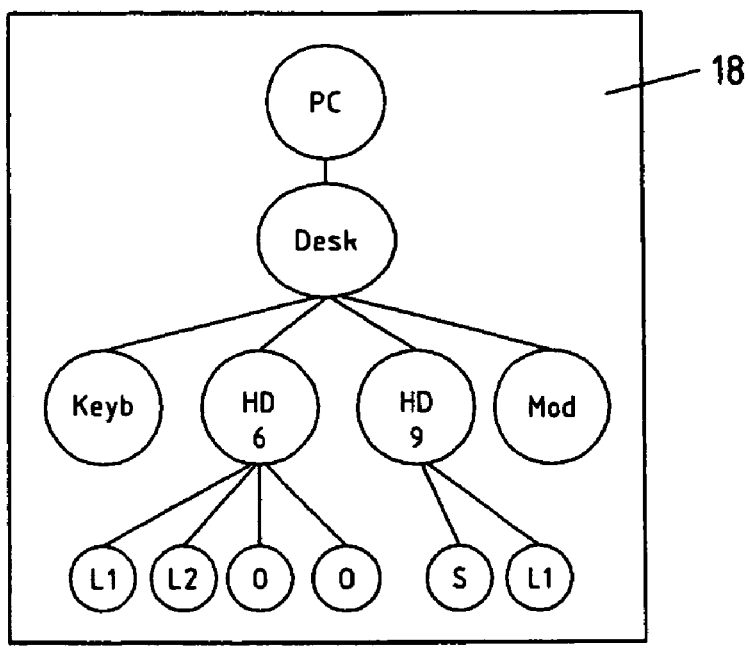

FIG. 3b depicts the structure of a further data object 18 which represents a PC. This PC has a desktop casing into which are built or to which are connected a keyboard, two hard disks, and a modem. The two hard disks, which again may be characterized by their size, have different partitions. The structures of these data objects 18 reproduce the structures of the real objects. The data objects 18 shown in FIG. 3 describe the structure of the products, here the PCs with their components.

Figure 4:
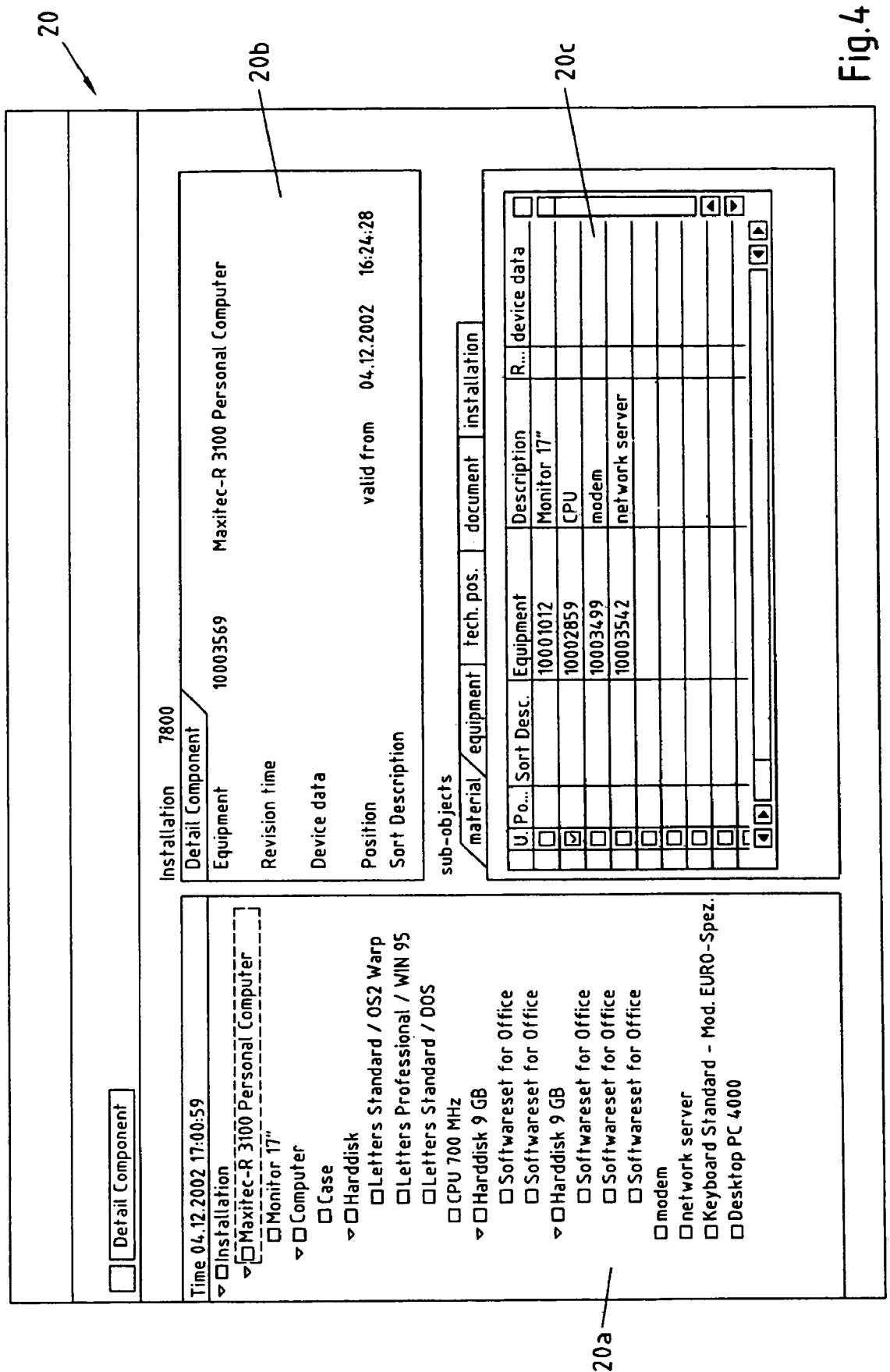
FIG. 4 is a representation of a sample business object on a screen.

FIG. 4 depicts a representation 20 of a data object 18 on a display. The individual components with their subcomponents may be arranged in a hierarchical structure 20a. In addition, detailed information on the individual components may be displayed 20b, 20c. The conversion of these data objects into text documents 10 may take place according the method described with reference to FIG. 1. The conversion of the generic data model into text documents 10 according to steps 6 and 8 may be made possible by an intermediate step, such as the creation of tables 28, 28a-c in FIGS. 5, 5a-c.

Figure 5:
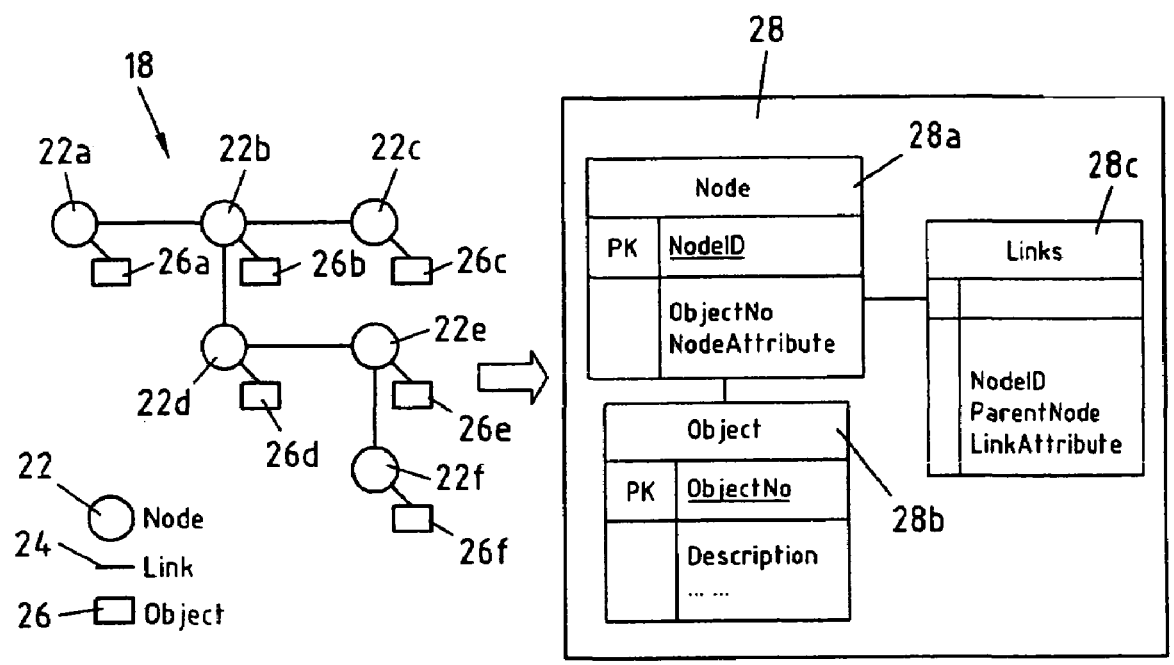
FIG. 5 shows a conversion of a generic data model into tables.

An exemplary data object 18 is also depicted in FIG. 5. This data object 18 shown in FIG. 5 is formed of nodes 22, e.g., 22a-f, links 24 and contents 26, e.g., 26a-f. The structure of the data object 18 may be mapped into the nodes 22a-f and the links 24. As shown in FIG. 5, the structure of the data object 18 may be hierarchical. Each node 22a-f may be linked to at least one further node 22a-f. The structure of the data object 18 can be represented by the nodes 22a-f and the respective links 24. The contents 26a-f of the data object 18 can be assigned to the structure. Since the nodes 22, the links 24 and the contents 26 represent the generic data model, each arbitrary data object 18 can be converted into a text document 10 using a suitable algorithm.

As an intermediate step, tables 28 may be created for the nodes 22, the links 24 and the contents 26. A table 28a may be created for the nodes 22, a table 28c may be created for the links 24 and a table 28b may be created for the contents 26.

FIG. 5a shows the exemplary structure of a table 28a. A table 28a, which has various fields, may be created for each node 22. The name of the node, the name of the entire family, the type of node or the user, for example, may be stored within these fields. The table 28a may be divided into the columns field name, type, length and brief description.

FIG. 5b shows the exemplary structure of a table 28c which represents the links 24 of the object structure. The respective links 24, together with their source nodes 22 and target nodes 22, may be described in this table 28c. As depicted, the table 28b comprises, for example, the columns field name, type, length and brief description. A table 28c can be generated for each link 24. Also a table 28c with the appropriate links 24 can be created for each node 22.

FIG. 5c depicts a table 28b which describes the contents 26 of the respective node 22. The table 28b may be divided into the columns field name, type, length and brief description. The contents 26 of the respective nodes 22, together with a description, may be stored into this table 28b.

As a result of the conversion of the generic data model into tables 28, a structured text document 10 which is searchable can be created using algorithms as is now described with reference to FIGS. 6-8.

Figure 6:
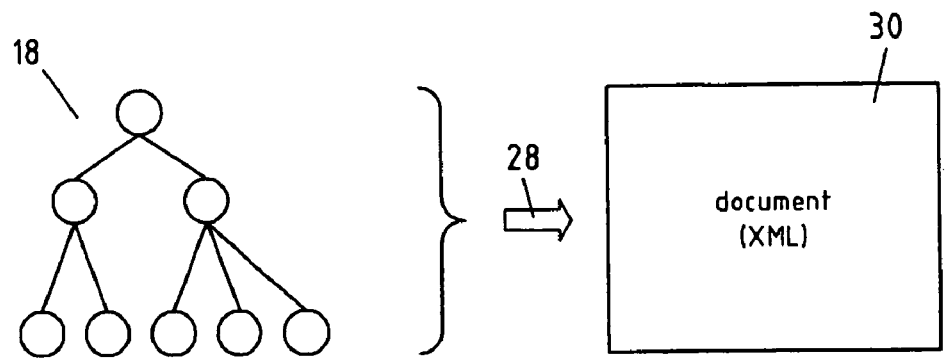
FIG. 6 shows one exemplary conversion of a data object into a document consistent with the present invention.

In FIG. 6, a single document 30 is depicted as being created from a data object 18 in step 28. The document 30 represents the entire tree structure 18b, for instance, of the data object 18. The document 30 itself can be an XML document 30, for example. The XML document 30 may be, on the one hand, flat and thus searchable or, on the other hand, structured.

Figure 7:
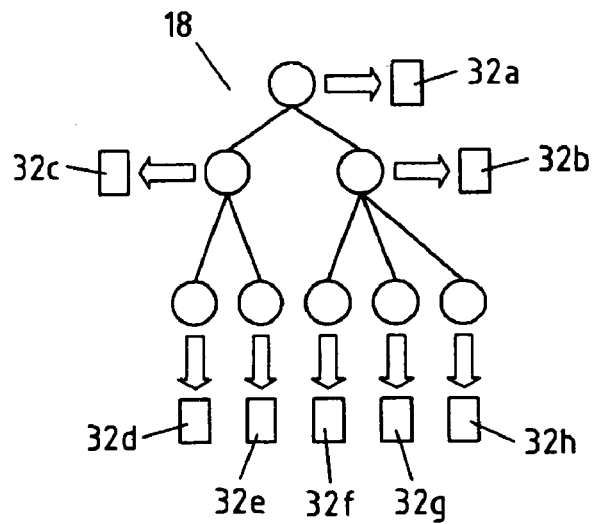
FIG. 7 shows one exemplary conversion of a data object into a plurality of documents consistent with the present invention.

FIG. 7 depicts how separate documents 32a-h may be created, one document 32 for each node 22, together with its links 24 of a data object 18.

Figure 8:
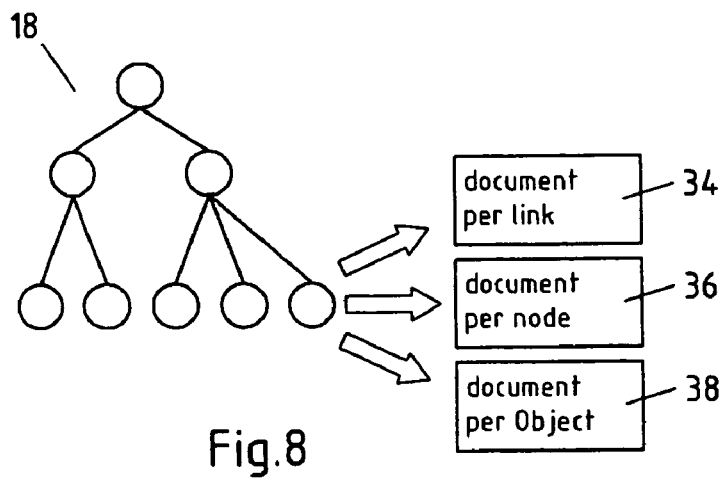
FIG. 8 shows another exemplary conversion of a data object into a plurality of documents.

Finally, as shown in FIG. 8, a data object 18 may be mapped into documents 34, 36, 38 such that a document 36 may be created per node 22, a document 34 per link 24, and a document 38 per object contents 26.

Figure 9:
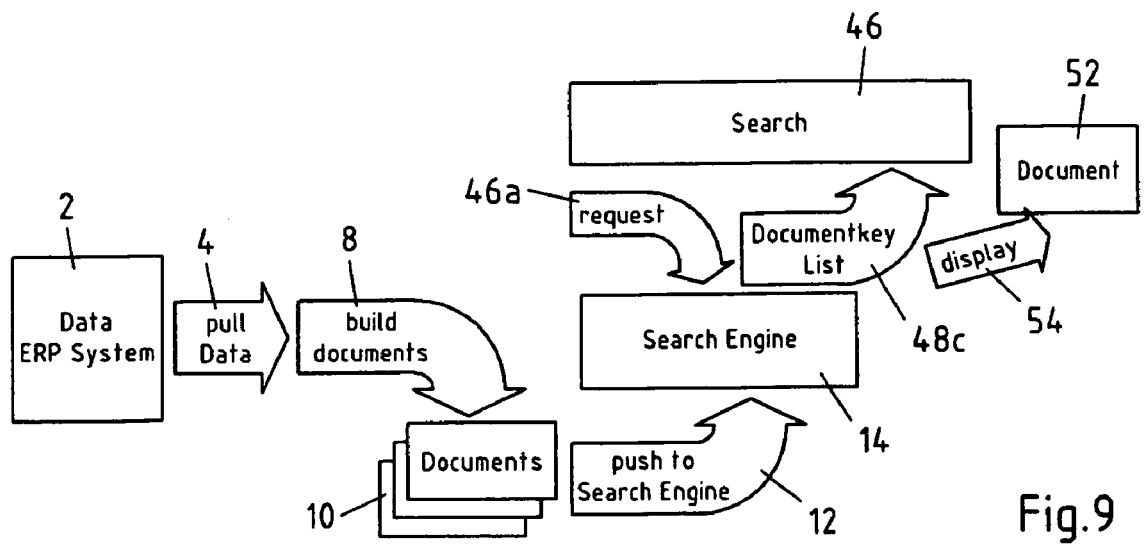
FIG. 9 illustrates one exemplary detailed method according to the invention.
Figure 10:
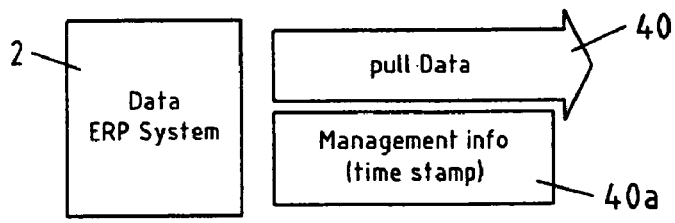
FIG. 10 shows an exemplary conversion of data objects into documents consistent with the present invention.
Figure 11:
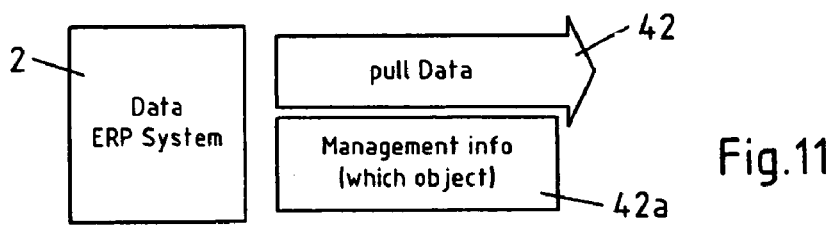
FIG. 11 shows another exemplary conversion of data objects into documents consistent with the present invention.
Figure 12:
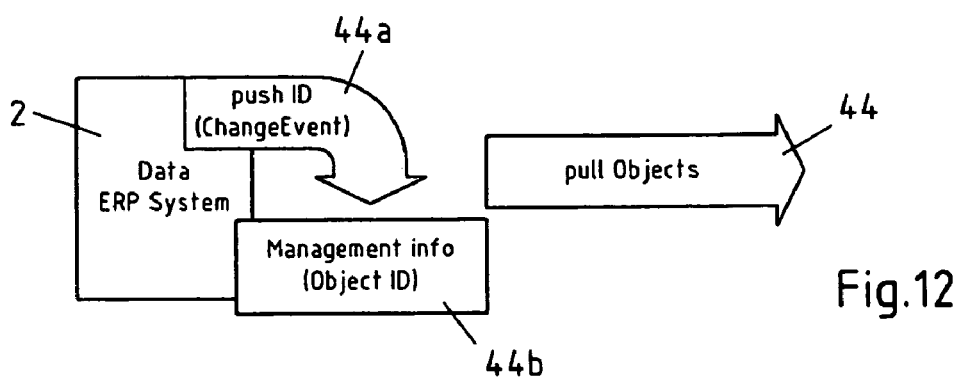
FIG. 12 shows yet another exemplary conversion of data objects into documents consistent with the present invention.

FIG. 9 shows a possible sequence of events in an exemplary search request performed consistent with principles of the present invention, and the preceding creation of a document index. The data objects 18 may be extracted from the database 2 (step 4) and text documents 10 may be created (step 8). The extraction in accordance with step 4 can take place in different ways, as shown in FIGS. 10-12.

In at least one embodiment, data objects may be extracted from database 2 using "pull" technology. As shown in FIG. 10, data 40 a is "pulled" from the ERP system in step 40. After data 40a have been extracted, these data 40a may be converted into text documents 10. Optionally, an index may be created from the text documents 10 that may be used by search engines 14. Using "pull" technology, however, data 40a may be extracted with a time delay, therefore the index may not be always up-to-date. Deleted objects may still appear in the index and newly created objects possibly may not yet be present in the index.

As shown in FIG. 11, data 42a may be again extracted from the database 2 using a pull method 42. On this occasion, however, the data 42a may be extracted or converted using administrative information. For example, a request to convert an individual data object may be received and only the selected data objects may be extracted or converted into document structures. In certain embodiments, the conversion of data objects into documents may take place only after a certain number of processes within the data objects so that, for example, a threshold value can be defined for the execution of an update process.

In certain embodiments consistent with the present invention, the creation of a document structure may be event-controlled. For example, changes to a document may trigger the creation or re-creation of one or more new document structures.

FIG. 12 shows an event-controlled, automatic extraction of data from the database 2. In the event there are changes to the data in the database 2, the database 2 may be notified in step 44a as to which data have changed. The changed data may be extracted in step 44b and made available for the creation of an index (step 44). Any change in the data leads to an updating of the index and the index may be kept up-to-date.

As shown in FIG. 9, after the data have been extracted (step 4), and the documents 10 have been created (step 8), an index may be created in step 12 which may be made available to the search engine 14. Steps 46a, 46, 48c, 54, and 52 of FIG. 9 are described in further detail below with reference to FIG. 14.

Figure 13:
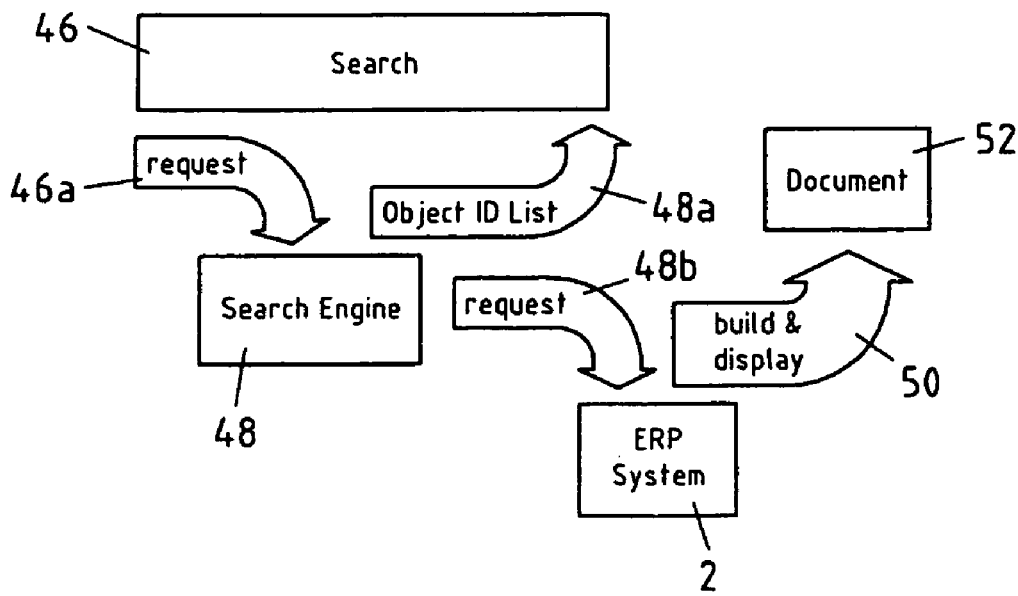
FIG. 13 illustrates a search request consistent with the present invention.
Figure 14:
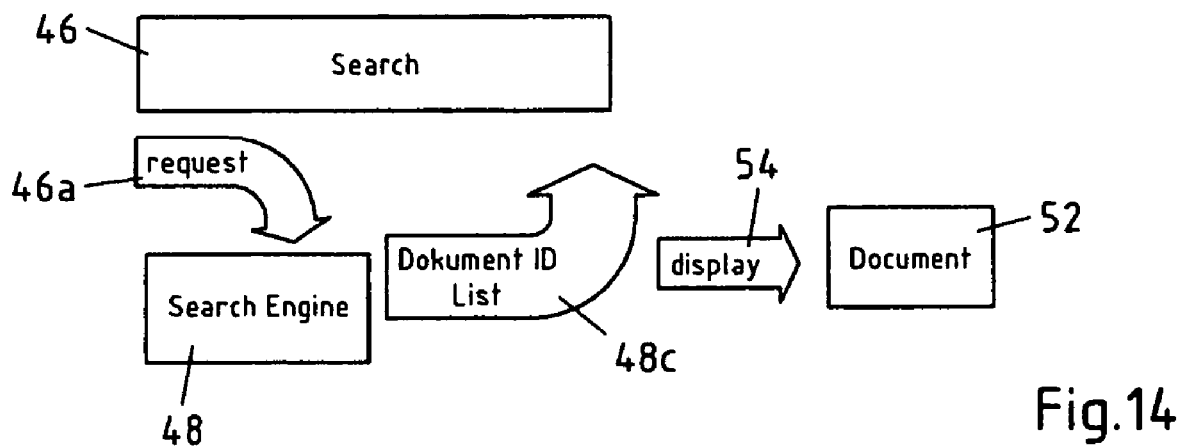
FIG. 14 illustrates a further search request consistent with the present invention.

The documents 10 may be stored either permanently or non-permanently. FIG. 13 shows an exemplary search request when the readable objects, that is, the documents 10 are stored in non-permanent data storage. FIG. 14 shows an exemplary search request when the readable objects, or documents 10, are stored in permanent data storage. In this context, storage is "permanent" if the intended term of the storage is indefinite at the instance of storage. A document 10 that is stored permanently nonetheless may be modified, deleted or overwritten, for example, at a later date, if desired.

As shown in FIG. 13, a search request 46a may be received via a search mask 46 and passed onto the search engine 48 in step 46a. The search engine 48 makes available an index which has been created from the documents 10. Using this index, a object ID list 48a can be output to the search mask 46 in step 48a. This object ID list 48a contains the object identifications which correspond to the search request 46a. By means of a user selection in the search mask 46, an output request 48b relating to the searched document 10 can be executed using the object hit list 48a. Such an output request 48b may be directed to the database 2 (see FIG. 1) whereupon in step 50 a document 10 may be re-created as document 52 for the searched object 18. This means that after a data object 18 has been found, a document 52 must be re-created from it. However, data redundancy may be avoided because, after the documents 10 have been created for the creation of the index, they may be deleted again. Documents 52 only need be re-created and displayed for required and requested data objects 18.

FIG. 14 shows the display of a document 52 in the case of permanently-stored documents 10. After the documents 10 have been created, they may be stored. A search request 46a may be transmitted to the search engine 48 via a search mask 46. In the event of a hit, the search engine 48 produces a document ID list 48c of links to the corresponding documents 10 to the search mask 46 in step 48c. The user can select the desired documents 10, 52 in the search mask 46 and make a display request 54. The permanently-stored document 52 may be displayed immediately to the user on the search mask 46. It is not necessary for the document 52 to be re-created. During a search for objects 18, the database 2 need not be involved.

The invention may also be embodied in a computer program product for providing at least one readable object for a search engine from at least one structured data object stored in a database, the product comprising instructions operable to cause a processor to: extract the structured data object from the database, map structure and contents of the structured data object into a generic data model, the generic data model including nodes related by links and having contents, and create the readable object from the generic data model.

The instructions may be defined and implemented, for example, using object-oriented code such as Java. In certain embodiments, the computer program product may be platform-independent. For example, the tables, which map the data objects can be converted into Java objects using suitable algorithms and then processed using suitable methods.

The present invention may also be embodied in a computer to provide at least one readable object for a search engine from at least one structured data object stored in a database. The computer may comprise extracting means for extraction of the structured data object from the database, mapping means for mapping structure and contents of the structured data object into a generic data model, the generic data model including nodes related by links and having contents, and creating means for creation of the readable object from the generic data model.

In certain embodiments, first and second storage means may also be provided. In these embodiments, information about the generic data model can be stored using the first storage means. The second storage means may be suitable for storing the created readable object.

Aspects of the present invention may also be embodied in a computer-readable medium with a computer program product stored thereon for providing at least one readable object for a search engine from at least one structured data object stored in a database, the product comprising instructions operable to cause the processor to: extract the structured data object from the database, map structure and contents of the structured data object into a generic data model, the generic data model including nodes related by links and having contents, and create the readable object from the generic data model.

Certain aspects of the present invention may be embodied in a display on a display device of a searchable document structure associated with a structured data object stored in a database, wherein the searchable document structure is formed from a generic data model, the generic data model including a mapping of structure and contents of the structured data object, the structured data object having been extracted from the database.

The invention has presently been shown with reference to exemplary embodiments. Other exemplary embodiments are also embraced by the claims. Individual steps of the methods according to the invention can be executed in a different order and still lead to the same result. The search for data objects is not limited to the business objects specified in the examples.

We claim:

1. A computer-implemented method for providing, via a computer processor, at least one readable object that is readable by a search engine from at least one structured data object stored in a database, the method comprising:

extracting, via the computer processor, the structured data object from the database, wherein the structured data object includes a hierarchical sequence of nodes related by at least one link and a plurality of content, and wherein at least one content of the plurality of content is nonreadable content that cannot be read by the search engine;

mapping, via the computer processor, the structured data object into a generic data model according to the hierarchical sequence of nodes and content; and creating, via the computer processor, the readable object from the generic data model, wherein creating includes converting the nonreadable content of the structured data object into readable content for the search engine.

2. The computer-implemented method of claim 1, wherein the generic data model includes at least three tables.

3. The computer-implemented method of claim 1, wherein the generic data model includes at least one table for mapping nodes of the structured data object.

4. The computer-implemented method of claim 1, wherein the generic data model includes at least one table for mapping links of the structured data object.

5. The computer-implemented method of claim 1, wherein the generic data model includes at least one table for mapping contents of the structured data object.

6. The computer-implemented method of claim 2, wherein the generic data model includes at least one table for mapping nodes, at least one table for mapping contents and at least one table for mapping links of the structured data object.

7. The computer-implemented method of claim 1, wherein the readable object comprises a document structure or a text document.

8. The computer-implemented method of claim 7, wherein document attributes are associated to the document structure.

9. The computer-implemented method of claim 7, wherein document keys are associated to the document structure.

10. The computer-implemented method of claim 7, wherein the document structure comprises a markup language text document, a standard generalized markup language text document or an extensible markup language text document.

11. The computer-implemented method of claim 1, wherein the method further comprises creating an indexable document structure from the structured data object.

12. The computer-implemented method of claim 1, wherein precisely one readable object is created from the structured data object.

13. The computer-implemented method of claim 1, wherein a readable object is created for each node of the structured data object.

14. The computer-implemented method of claim 1, wherein a readable object is created for each node, each link, and each content of the structured data object, respectively.

15. The computer-implemented method of claim 1, wherein the readable object includes a non-permanently stored readable object.

16. The computer-implemented method of claim 15, wherein the method further comprises creating an index from the non-permanently stored readable object.

17. The computer-implemented method of claim 1, wherein the readable object includes a permanently stored readable object.

18. The computer-implemented method of claim 17, wherein the method further comprises creating an index from the permanently stored readable object.

19. The computer-implemented method of claim 1, wherein providing the readable object from the structured data object occurs after a variable time interval.

20. The computer-implemented method of claim 1, wherein providing the readable object from the structured data object is event-controlled.

21. The computer-implemented method of claim 1, wherein the method further comprises executing a search of the contents of the structured data object using the search engine, and wherein the readable object is at least partly displayed when locating the readable object.

22. The computer-implemented method of claim 21, wherein the method further comprises creating an index for the search engine from the readable object, and wherein executing a search of the contents of the structured data object includes using the index during the search with the search engine.

23. The computer-implemented method of claim 21, wherein executing a search of the contents of the structured data object includes searching the readable object as full text.

24. The computer-implemented method of claim 21, wherein executing a search of the contents of the structured data object includes performing an authorization check for the search and wherein the search may be completed only when permitted by the authorization check.

25. The computer-implemented method of claim 1, wherein the structured data object comprises a business object of an enterprise resource planning (ERP) software.

26. A computer program product stored on a computer readable medium, the computer program product providing at least one readable object that is readable by a search engine from at least one structured data object stored in a database, the product comprising instructions configured to cause a processor to:

extract the structured data object from the database, wherein the structured data object includes a hierarchical sequence of nodes related by at least one link and a plurality of content, and wherein at least one content of the plurality of content is nonreadable content that cannot be read by the search engine;

map the structured data object into a generic data model according to the hierarchical sequence of nodes and content; and create the readable object from the generic data model, wherein creating includes converting the nonreadable content of the structured data object into readable content for the search engine.

27. The computer program product of claim 26, wherein the instructions include object-oriented programming.

28. The computer program product of claim 26, wherein the generic data model includes at least one table for mapping nodes of the structured data object.

29. The computer program product of claim 26, wherein the generic data model includes at least one table for mapping links of the structured data object.

30. The computer program product of claim 26, wherein the generic data model includes at least one table for mapping contents of the structured data object.

31. The computer program product of claim 26, wherein the generic data model includes at least three tables into which the processor maps structure and contents of the structured data object.

32. The computer program product of claim 31, wherein the generic data model includes at least one table for mapping nodes, at least one table for mapping contents and at least one table for mapping links of the structured data object.

33. The computer program product of claim 26, wherein the readable object comprises a document structure or a text document.

34. The computer program product of claim 26, wherein the instructions are configured further to cause the processor to store the readable object as a non-permanently stored readable object.

35. The computer program product of claim 34, wherein the instructions are configured further to cause the processor to provide an index from the non-permanently stored readable object.

36. The computer program product of claim 26, wherein the instructions are configured to cause the processor to store the readable object as a permanently stored readable object.

37. The computer program product of claim 36, wherein the instructions are configured to cause the processor to provide an index from the permanently-stored readable object.

38. The computer program product of claim 26, wherein the instructions are configured to cause the processor to provide the readable object from the structured data object after a variable time interval.

39. The computer program product of claim 26, wherein the instructions are configured to cause the processor to provide the readable object from the structured data object upon an occurrence of a predetermined event.

40. The computer program product of claim 26, wherein the instructions configured to cause the processor to create the readable object from the generic data model include instructions configured to cause the processor to create one the readable object for each node mapped for the structured data object within the generic data model.

41. The computer program product of claim 26, wherein the instructions configured to cause the processor to create the readable object from the generic data model include instructions configured to cause the processor to create one the readable object for each link mapped for the structured data object within the generic data model.

42. The computer program product of claim 26, wherein the instructions configured to cause the processor to create the readable object from the generic data model include instructions configured to cause the processor to create one the readable object for each content mapped for the structured data object within the generic data model.

43. The computer program product of claim 26, wherein the instructions configured to cause the processor to create the readable object from the generic data model include instructions configured to cause the processor to create one the readable object for each node, one the readable object for each link and one the readable object for each content mapped for the structured data object within the generic data model.

44. A computer for providing at least one readable object that is readable by a search engine from at least one structured data object stored in a database, the computer comprising a processor for:
   extracting the structured data object from the database, wherein the structured data object includes a hierarchical sequence of nodes related by at least one link and a plurality of content, and wherein at least one content of the plurality of content is nonreadable content that cannot be read by the search engine;
   mapping the structured data object into a generic data model according to the hierarchical sequence of nodes and content; and
   creating the readable object from the generic data model, wherein creating includes converting the nonreadable content of the structured data object into readable content for the search engine.

45. The computer of claim 44, further comprising first storage means for storage of the generic data model in tables.

46. The computer of claim 45, further comprising second storage means for storage of the readable object formed from the generic data model.

47. The computer of claim 46, wherein the second storage means comprises non-permanent memory.

48. The computer of claim 46, wherein the second storage means comprises permanent memory.

49. The computer of claim 44, further comprising an interface for access of the search engine to the readable object.

50. The computer of claim 44, further comprising indexing means for indexing the readable object.

51. The computer of claim 50, further comprising searching means for searching within the index.

52. The computer of claim 44, further comprising searching means for searching within the readable object.

53. A computer-readable medium including instructions, when executed, cause a processor to perform a method for providing at least one readable object that is readable by a search engine from at least one structured data object stored in a database, the method comprising:
   extracting the structured data object from the database, wherein the structured data object includes a hierarchical sequence of nodes related by at least one link and a plurality of content, and wherein at least one content of the plurality of content is nonreadable content that cannot be read by the search engine;
   mapping the structured data object into a generic data model according to the hierarchical sequence of nodes and content; and
   creating the readable object from the generic data model, wherein creating includes converting the nonreadable content of the structured data object into readable content for the search engine.

54. The computer-readable medium of claim 53, wherein the instructions include object-oriented programming.

55. The computer-readable medium of claim 53, wherein the generic data model includes at least one table for mapping nodes of the structured data object.

56. The computer-readable medium of claim 53, wherein the generic data model includes at least one table for mapping links of the structured data object.

57. The computer-readable medium of claim 53, wherein the generic data model includes at least one table for mapping contents of the structured data object.

58. The computer-readable medium of claim 53, wherein the generic data model includes at least three tables into which the processor maps structure and contents of the structured data object.

59. The computer-readable medium of claim 58, wherein the generic data model includes at least one table for mapping nodes, at least one table for mapping contents and at least one table for mapping links of the structured data object.

60. The computer-readable medium of claim 53, wherein the instructions are configured further to cause the processor to store the readable object as a non-permanently stored readable object.

61. The computer-readable medium of claim 60, wherein the instructions are configured further to cause the processor to provide an index from the non-permanently stored readable object.

62. The computer-readable medium of claim 53, wherein the instructions are configured further to cause the processor to store the readable object as a permanently stored readable object.

63. The computer-readable medium of claim 62, wherein the instructions are configured further to cause the processor to provide an index from the permanently stored readable object.

64. The computer-readable medium of claim 53, wherein the instructions are configured further to cause the processor to provide the readable object from the structured data object after a variable time interval.

65. The computer-readable medium of claim 53, wherein the instructions are configured to cause the processor to provide the readable object from the structured data object upon an occurrence of a predetermined event.

66. The computer-readable medium of claim 53, wherein the instructions configured to cause the processor to create the readable object from the generic data model include instructions configured to cause the processor to create one the readable object for each node mapped for the structured data object within the generic data model.

67. The computer-readable medium of claim 53, wherein the instructions configured to cause the processor to create the readable object from the generic data model include instructions configured to cause the processor to create one the readable object for each link mapped for the structured data object within the generic data model.

68. The computer-readable medium of claim 53, wherein the instructions configured to cause the processor to create the readable object from the generic data model include instructions configured to cause the processor to create one the readable object for each content mapped for the structured data object within the generic data model.

69. The computer-readable medium of claim 53, wherein the instructions configured to cause the processor to create the readable object from the generic data model include instructions configured to cause the processor to create one the readable object for each node, one the readable object for each link and one the readable object for each content mapped for the structured data object within the generic data model.

70. A computer-implemented method for the creation, via a computer processor, of at least one flattened readable object that is readable by a search engine from at least one hierarchical structured data object stored in a database, the method comprising:

extracting, via the computer processor, the hierarchical structured data object from the database, wherein the hierarchical structured data object includes a hierarchical sequence of nodes related by at least one link and a plurality of content, and wherein at least one content of the plurality of content is nonreadable content that cannot be read by the search engine;

mapping, via the computer processor, structure and contents of the structured data object into a generic data model; and creating, via the computer processor, the flattened readable object from the generic data model, wherein creating includes converting the nonreadable content of the hierarchical structured data object into the readable content for the search engine.

71. The computer-implemented method of claim 70 wherein the hierarchical structured data object comprises a business object of an enterprise resource planning (ERP) software.

72. The computer-implemented method of claim 70 wherein the flattened readable object comprises a document structure or a text document.

73. The computer-implemented method of claim 70 wherein the hierarchical structured data object comprises a business object of an enterprise resource planning (ERP) software.

\* \* \* \* \*

UNITED STATES PATENT AND TRADEMARK OFFICE
CERTIFICATE OF CORRECTION

PATENT NO. : 7,668,888 B2 Page 1 of 1
APPLICATION NO. : 10/846689
DATED : February 23, 2010
INVENTOR(S) : Irle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this

Seventh Day of December, 2010

David J. Kappos
*Director of the United States Patent and Trademark Office*